UNITED STATES PATENT OFFICE.

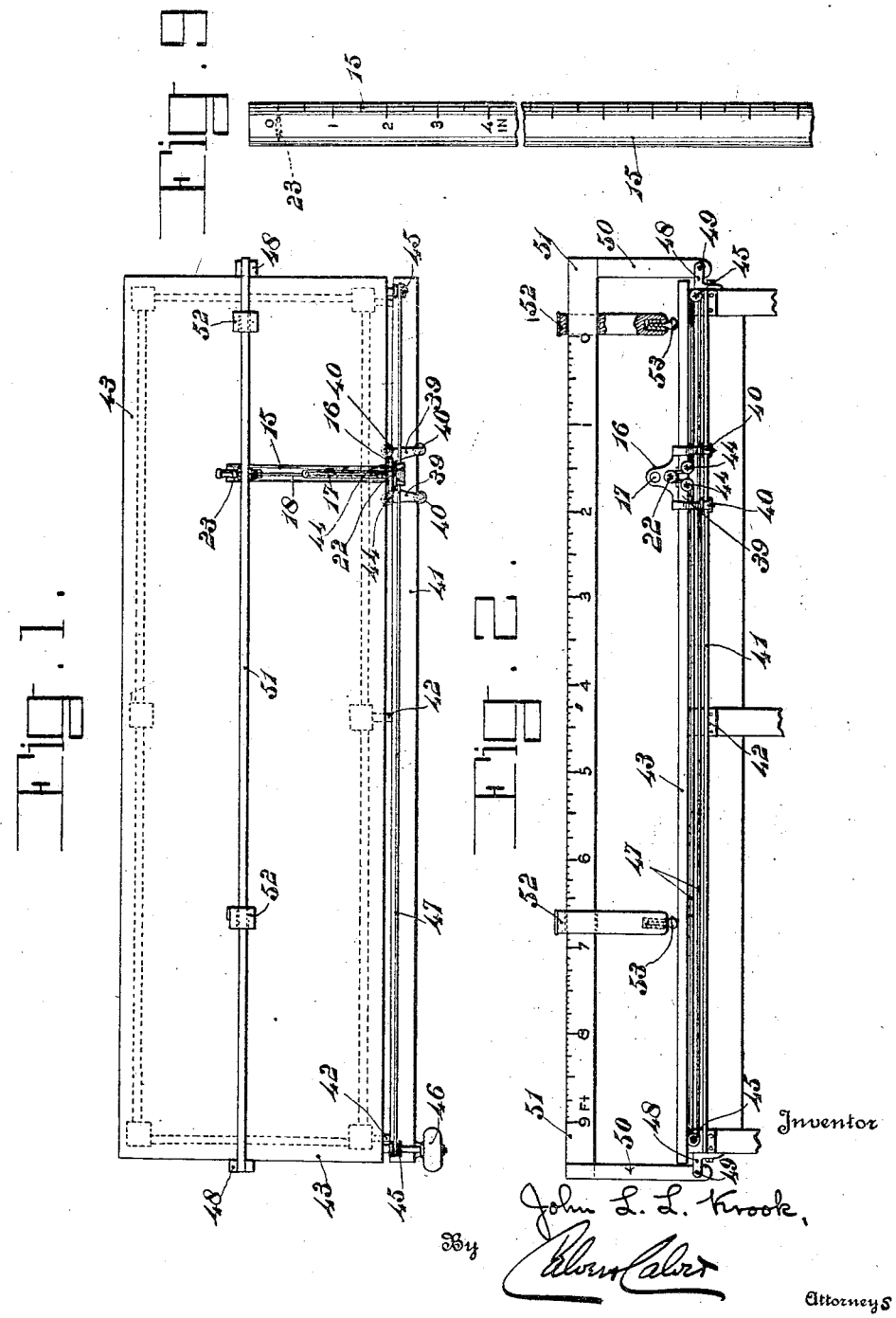

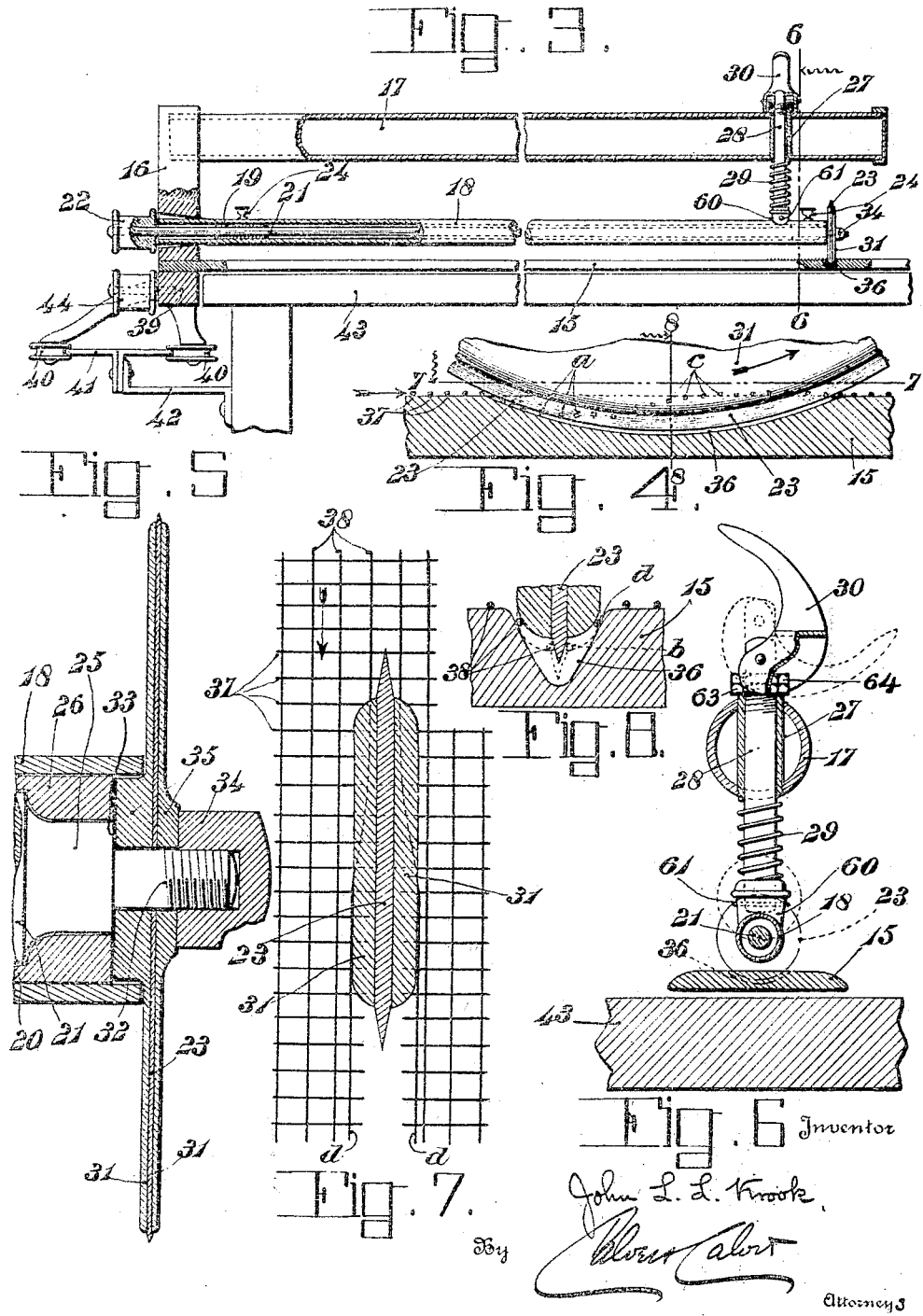

JOHN L. L. KROOK, OF PROCTOR, VERMONT.

GAUZE-CUTTING MACHINE.

1,288,038.   Specification of Letters Patent.   Patented Dec. 17, 1918.

Application filed October 15, 1917. Serial No. 196,606.

*To all whom it may concern:*

Be it known that I, JOHN L. L. KROOK, a citizen of the United States, residing at Proctor, in the county of Rutland and State of Vermont, have invented or discovered certain new and useful Improvements in Gauze-Cutting Machines, of which the following is a specification, reference being had therein to the accompanying drawings.

This invention relates to machines for cutting textile material and more particularly for cutting antiseptic gauze for use in surgical dressings and bandages.

Surgical gauze is usually woven in broad webs which are wound into rolls, and which must be cut into strips or sheets of various sizes and proportions according to the requirements of use. In so cutting the gauze it is customary to "cut by the thread," that is to say, to cut the transverse threads between two adjacent longitudinal threads without cutting the latter, in order to avoid the production of a ragged edge. The manual operation of cutting gauze in this manner by means of hand shears is a slow and laborious one. Machines, suitable for factory use, have been devised for cutting the web of gauze, as it comes from the loom, into strips of standard widths. While such strips are suitable for some purposes, varying conditions and requirements frequently call for the use of pieces of gauze of shapes and sizes not conforming to the stock sizes provided. The cutting of such pieces has heretofore been done by hand, with the disadvantages incidental to such manual work, the machines above referred to being heavy, expensive, and complicated, requiring elaborate adjustments in order to vary the size of the pieces cut, and being otherwise unsuited to work of the kind referred to.

The present invention has for its object the provision of a light, simple, inexpensive, and readily portable apparatus for rapidly cutting surgical gauze "by the thread", that is to say, for making a cut which is automatically confined to the space between two threads extending longitudinally of the cut, which machine requires a relatively small amount of power for its operation, which will readily, conveniently, and without any considerable adjustment, cut strips and sheets of any desired width and length, and which is otherwise well suited to the use of hospitals, surgical work-rooms, etc.

The foregoing and other objects of the invention, together with means whereby the same may be carried into effect, will best be understood from the following description of one form or embodiment thereof illustrated in the accompanying drawings. It will be understood, however, that the particular construction and arrangement de- of one form or embodiment thereof illustrative purposes merely, and that the invention, as defined by the claims hereunto appended, may be otherwise practised without departing from the spirit and scope thereof.

In said drawings:

Figure 1 is a plan view and Fig. 2 a side elevation of the complete apparatus.

Fig. 3 is an end elevation, partly broken away and on a somewhat larger scale.

Fig. 4 is a fragmentary view, on a greatly exaggerated scale, showing a portion of the cutter in side elevation and a portion of the work supporting arm in section.

Fig. 5 is a section, also on an enlarged scale somewhat less, however, than that of Fig. 4, of the cutter and adjacent parts.

Fig. 6 is a section on the line 6—6, Fig. 3, the scale being greater than that of Fig. 3 but less than that of Fig. 5.

Figs. 7 and 8 are diagrammatic sectional views on the lines 7—7 and 8—8, respectively, Fig. 4, the scale being substantially the same as that of the latter figure.

Fig. 9 is a detail plan view of the graduated work supporting arm, the scale being substantially that of Fig. 3.

Referring to Fig. 3, the cutting device, *per se*, comprises a work supporting arm 15 upon one end of which is mounted an upright 16 supporting at its upper end an overhanging arm 17 extending substantially parallel to the arm 15. Mounted in an opening in the upright 16, and extending parallel to the arms 15 and 17, is a sleeve 18 containing bearings 19 and 20 (see also Fig. 5) in which is journaled a shaft 21. The shaft 21 may be rotated by any suitable or well known means, as by an electric motor directly connected thereto, but for this purpose, in the present instance, there is shown a belt pulley 22 secured to said shaft at the end adjacent the upright 16 and beyond the same. At its end opposite the pulley 22 the shaft 21 has directly secured thereto a circular cutter 23.

The bearings for the shaft 21 may be lubricated in any suitable manner, as by means of oil cups 24, and in order to prevent the lubricant from reaching the cutter, and thereby fouling the gauze or other fabric, the shaft 21 is provided, adjacent the cutter, with a reduced portion 25 (see Fig. 5) forming, in effect, an annular groove which receives an internal annular flange 26 at the end of the bearing 20.

The opening in the upright 16 to receive the sleeve 18, while substantially fitting said sleeve at its inner end, is of slightly greater diameter at its outer end, thereby permitting a vertical adjustment of the end of said sleeve adjacent the cutter 23, whereby said cutter may be moved toward or away from the work support 15. 28 denotes a rod pivoted at its lower end, by means of a pin 61, in a socket 60 formed on the upper side of the sleeve 18. Said rod projects upwardly from the sleeve 18, and is guided for vertical movement in a bushing 27 (see also Fig. 6) in the arm 17. Surrounding the rod 28, and interposed between the arm 17 and sleeve 18, is a spring 29 tending normally to force the cutter 23 toward the work support 15. The movement of said cutter toward said work support under the influence of said spring is limited by a stop nut 63 on the threaded upper end of the rod 28 and engaging the upper end of the bushing 27, said stop nut being held in adjusted position by a lock nut 64. Pivoted to the upper end of the rod 28, and engaging the upper face of the arm 17, is a cam lever 30, said cam lever being operable to draw upwardly upon the rod 28 (see dotted lines, Fig. 6), thereby separating the cutter 23 from the work support 15 to facilitate the introduction of the fabric to be cut.

The cutter 23 comprises a thin, wafer-like, circular disk of steel, preferably less than $\frac{1}{64}$ inch in thickness, and having a peripheral cutting edge ground to a razor-like sharpness. Said cutter is provided on its opposite sides with guards 31 which preferably comprise thin, circular, metallic disks of slightly less diameter than the cutter 23 and secured thereto substantially concentric therewith, so that the edges of said guard disks are spaced a short distance from the edge of said cutter. The thickness of each of the guard disks 31 is preferably slightly less than $\frac{1}{32}$ inch, so that the thickness of the entire structure composed of the cutter and guards is approximately $\frac{1}{16}$ inch, or somewhat greater than the space between two adjacent threads of surgical gauze of standard weave, the thickness of the cutter alone being less than the width of said space. The shaft 21 is formed with a reduced end portion 32 (see Fig. 5) passing through central openings in the cutter 23 and guard disks 31, said cutter and guard disks being clamped against a shoulder 33 on said shaft by a finger nut 34, on the threaded end of the shaft portion 32, which finger nut may be readily removed in order to replace a cutter which has become dulled by use with a sharp one. The peripheral edges of the guard disks 31 are rounded, so as to recede from the edge of the cutter and from the faces thereof, and are smooth and polished. In order to secure a close engagement between the edges of the guard disks and the faces of the cutter, said guard disks are preferably formed slightly concave on their inner faces, being sprung into the flat form shown in Fig. 5, by tightening the nut 34, and being reinforced at their centers by thickened portions 35 through which the reduced end 32 of the shaft 21 passes. Said guard disks, when clamped against the thin disk cutter 23, will bear hardest against the outer part of said cutter and will thus effectively steady and support the same laterally.

The work-supporting arm 15 is provided, beneath the cutter 23, with a recess 36 longitudinally curved, as shown in Fig. 4, to correspond to the shape of the periphery of the cutter. In transverse section (see Fig. 8) the relative width and depth of the recess 36, with respect to the proportions of the cutter and guards, is such that the cutting edge of the cutter cannot be brought into engagement with the bottom of said recess, accidental depression of the cutter with respect to the work support beyond its normal position causing the edges of the guards to engage the lateral walls of said recess before the edge of the cutter can reach the bottom thereof, as indicated in dotted lines in Fig. 8. The normal or operative position of the cutter is shown in full lines in Fig. 8, this position (controlled by the spring 29 and stop nut 63, as above explained) being such that the edges of the guards are spaced from the walls of the recess a distance approximately equal to or slightly greater than the thickness of a thread of the fabric cut.

The operation of the device thus far described is as follows: In cutting the gauze longitudinally the weft threads will be cut between two adjacent warp threads, whereas in cutting the same transversely the warp threads will be cut between two adjacent weft threads. For purposes of description it will be assumed that a longitudinal cut is to be made. The cutter having been raised by manipulation of the cam lever 30, a piece of gauze is placed beneath the same, and the cam lever again manipulated to cause the spring 29 to return the cutter to normal position, as shown in full lines in Figs. 3, 4, 6, and 8. The edge of the cutter is thus caused to engage certain of the weft threads 37 (Figs. 4 and 7) between two adjacent warp threads 38 (Figs. 7 and 8), thereby tending to depress the gauze into the recess 36, as indicated, in the case of the weft threads, at a in Fig. 4, and, in the case of the warp threads, in dotted lines at b in Fig. 8. The cutter 23 being rotated at a high rate of speed, the cutting edge thereof severs the weft threads in engagement therewith. As the weft threads are cut, the gauze, which is preferably held under a slight tension, tends to rise out of the recess, as indicated at c in Fig. 4, the weft threads passing upwardly over the smooth, rounded edges of the guards 31 to the sides thereof, and being spread apart thereby, as indicated at d in Figs. 7 and 8. As the gauze is fed relatively to the cutter in the direction of the arrow on Fig. 4, and as the cut progresses longitudinally of the gauze, the guards 31 by engagement with the warp threads, hold the latter away from the edge of the cutter and prevent them from coming in contact therewith, thereby so relatively guiding the gauze and cutter that the weft threads are accurately cut between the warp threads without injury to the latter.

It will thus be seen that the gauze can be readily and accurately cut at any point and into pieces of any desired length and width by properly positioning the gauze and cutter and thereafter relatively moving the same the necessary distance. This relative movement may be obtained by moving either the gauze or the cutter. For example, if the cutting mechanism be mounted in fixed position, the gauze may be fed thereto by hand. Preferably, however, a construction is provided whereby the gauze may be clamped flat in stationary position and the cutting mechanism moved thereover, said construction including measuring means whereby the cutting of the gauze to certain dimensions is greatly facilitated.

Referring to Figs. 1, 2 and 3, the cutting mechanism above described, as a whole, is mounted on a carriage 39 provided with rollers 40 which travel on a track or guide 41 secured, as by brackets 42, to a table 43 and extending parallel to one edge thereof. Said track or guide extends longitudinally of the table 43, while the cutting mechanism is so mounted on its carriage 39 that the work-supporting arm 15 and shaft 21 extend transversely of the table, the plane of the cutting edge of the cutter being parallel to the guide 41. By this arrangement, when the carriage 39 is moved upon its guide 41, the cutter is caused to move over the table in the direction of the cut made thereby.

For continuously supplying power to the cutter irrespective of the movement of the cutting mechanism as a whole, the following mechanism is provided. Suitably journaled on the carriage 39 at opposite sides of the pulley 22, and slightly below the same, are two idler pulleys 44. Suitably journaled on the table 43 adjacent the opposite ends of the track or guide 41, are pulleys 45, one of which may be an idler pulley and the other of which may be driven from any suitable source of power, as by means of an electric motor. 47 denotes a belt passing about the pulleys 45, beneath and between the pulleys 44, and over the pulley 22, by means of which, as will be seen, power may be communicated from the motor 46 to the shaft 21 and cutter 23 irrespective of the position of the carriage 39 on its guide 41.

Secured to the opposite ends of the table 43 are brackets 48 upon which are detachably mounted, as by means of removable pins 49, uprights 50 carrying at their upper ends a graduated beam 51 arranged longitudinally of the table parallel to the track or guide 41 and substantially in the plane of the cutter 23, said beam serving as a guide for slides 52 carrying at their lower ends spring-pressed clamps 53 coöperating with the table 43. The beam 51 is preferably graduated in feet, inches and fractions, while the work-supporting arm 15 (see Fig. 9) of the cutting mechanism is also graduated in inches from a zero point in the plane of the cutter 23.

In order to cut a piece of gauze of a given length and width, a sheet or web of gauze is laid upon the table 43 above the work supporting arm 15 and between the same and the cutter 23, the latter being raised for this purpose, as above explained. Said sheet or web is placed with its edge at the graduation on the arm 15 representing the width desired, and the slides 52 are moved on the beam 51 to points (indicated by the scale on said beam) separated by a distance approximately equal to or slightly greater than the desired length. The sheet of gauze is then spread out flat and preferably placed under a slight longitudinal tension, being secured in this position between the clamps 53 and the table 43. It will, of course, be understood that the two clamps 53 will be caused to engage the gauze at corresponding transverse points, that is to say, to engage the same longitudinal threads thereof, so that the longitudinal threads between which the cut is made will be parallel to the guide or track 41. The cutting mechanism is now moved into engagement with one of the clamps 53, the cutter depressed, and the cutting mechanism (the cutter being rotated) then moved longitudinally on its track 41 toward the other clamp 53, and finally into engagement therewith, thereby producing a longitudinal cut of the desired length and at the desired distance from the free edge of the web. Thereafter the gauze may be removed, turned at right angles to its former position, and again so placed upon and secured to the table that the necessary transverse cut may be made therein.

The machine above described, while designed primarily for the purpose of cutting gauze for surgical dressings, is not limited to this particular use, being suitable, either with or without slight modification, for any textile cutting operation in which similar conditions obtain, for example, for the purpose of ripping seams by cutting the seam threads without injuring the fabric joined by the seam, and for other purposes.

Having thus described my invention, I claim and desire to secure by Letters Patent:

1. In an apparatus for cutting textile material, a cutter having a cutting edge to cut the transverse threads of said material and having a pair of guards at its opposite sides, said guards having smooth edges spaced from the edge of the cutter and adapted to engage longitudinal portions of said material to guide the relative movement of said material and cutter and prevent said longitudinal portions from coming in contact with the cutting edge of said cutter.

2. In an apparatus for cutting textile material, a circular rotary cutter having a peripheral cutting edge to cut the transverse threads of said material and having a pair of guards at its opposite lateral sides, said guards being of slightly less diameter than the cutter and having smooth peripheral edges spaced from the edge of the cutter, the edges of said guards being adapted to engage longitudinal portions of said material to guide the relative movement of said material and cutter and prevent said longitudinal portions from coming in contact with the cutting edge of said cutter.

3. In an apparatus for cutting textile material, a cutter having a cutting edge to cut the transverse threads of said material and having a pair of guards at its opposite sides, said guards having smooth rounded edges spaced from the edge of the cutter and adapted to engage longitudinal portions of said material to guide the relative movement of said material and cutter and prevent said longitudinal portions from coming in contact with the cutting edge of said cutter.

4. In an apparatus of the character described, the combination with a rotary shaft, of a thin, wafer-like, circular cutter having a peripheral cutting edge, a pair of spring metal guard disks of slightly less diameter than said cutter and bearing against the opposite lateral faces thereof, said guard disks being normally slightly concave on their inner faces so that when clamped against said cutter they will bear hardest against the same near said peripheral cutting edge, said disks having smooth peripheral edges slightly spaced from the edge of said cutter, and a clamping nut on said shaft, said nut impinging against the outer one of said guard disks.

5. In an apparatus for cutting textile material, the combination with a rotary cutter consisting of a thin, wafer-like, circular disk having a razor-like peripheral cutting edge, of a pair of thin, spring metal guard disks concentric with and bearing against the opposite faces of said cutter, said spring metal disks being normally slightly concave on their inner faces and of slightly less diameter than said cutter, so that when clamped against the latter they will bear hardest against the same near said peripheral cutting edge, said disks having thickened portions near their centers, a shaft on which said cutter and guard disks are mounted, and clamping means for attaching said cutter and disks to said shaft.

6. A machine for cutting textile fabric comprising a rotary cutter having a peripheral cutting edge and a pair of guards at its opposite sides, a work support having a recess in which the edges of said cutter and guards are received, and means for normally holding said cutter in fixed position with respect to said work support with the edges of said guards spaced from the walls of said recess a distance at least equal to the thickness of the threads of which said fabric is composed.

7. A machine of the character described comprising a rotary cutter having a peripheral cutting edge and a work-support in which the edge of said cutter is received, said cutter having a pair of guards at its opposite sides adapted to engage the walls of said recess and prevent said cutting edge from coming in contact therewith.

8. A machine for cutting textile fabric comprising a support for said fabric, and a rotary cutter having a peripheral cutting edge at all times out of contact with said support for cutting the warp threads, said cutter having a pair of guards at its opposite sides provided with guide portions engaging the weft threads of said fabric.

9. A machine of the character described comprising a work-support, a rotary shaft, a hollow, horizontally disposed, swinging support in which said shaft is journaled and through which it extends, a cutter attached to said shaft and having a peripheral cutting edge, a spring pressing said swinging support toward said work-support, an adjustable stop for limiting the movement of the cutter toward the work, and means for lifting said swinging support and cutter when the work is to be inserted.

10. A machine of the character described comprising a work support, a rotary cutter having a peripheral cutting edge, a shaft on which said cutter is mounted, means for supporting said shaft to permit said cutter to move toward and away from said work-support, a spring for moving said cutter toward said support, an adjustable stop nut for limiting the movement of said cutter toward said work-support, under the influence of said spring, and a cam lever for moving the same away therefrom.

11. A machine of the character described comprising a work support, an upright on said work support, a horizontal sleeve loosely supported by said upright so that it may swing slightly to enable its free end to be raised and lowered, a shaft journaled within said sleeve, a rotary cutter carried by said shaft, means for yieldingly pressing said cutter toward said work-support, and a stop to limit the movement of said cutter under the influence of said pressing means.

12. An apparatus for cutting fabric comprising a table for supporting the fabric to be cut, a graduated beam above said table, one or more clamping devices slidably mounted on said beam for clamping said fabric to said table, a guide on said table, and a cutting device mounted to travel on said guide.

13. An apparatus for cutting fabric comprising a table for supporting the fabric to be cut, a graduated beam above said table, one or more clamping devices slidably mounted on said beam for clamping said fabric to said table, a guide on said table, and a cutting device mounted to travel on said guide, said cutting device comprising a graduated arm extending beneath said fabric and a rotary cutter above said arm and having a peripheral cutting edge.

In testimony whereof I affix my signature.

JOHN L. L. KROOK.

Copies of this patent may be obtained for five cents each, by addressing the "Commissioner of Patents, Washington, D. C."